US012693944B2

(12) United States Patent
Kedlaya et al.

(10) Patent No.: US 12,693,944 B2
(45) Date of Patent: Jul. 28, 2026

(54) NATIVE TRANSACTION GUARD

(71) Applicant: Oracle International Corporation, Redwood Shores, CA (US)

(72) Inventors: Natesh Kedlaya, Redwood City, CA (US); Sukhada Pendse, Foster City, CA (US); Ajit Mylavarapu, Mountain View, CA (US); Tirthankar Lahiri, Palo Alto, CA (US); Carol Lyndall Colrain, Kansas City, KS (US); Xiaoli Qi, Palo Alto, CA (US); Juan R. Loaiza, Woodside, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/884,628

(22) Filed: Sep. 13, 2024

(65) Prior Publication Data

US 2025/0094294 A1 Mar. 20, 2025

Related U.S. Application Data

(60) Provisional application No. 63/538,564, filed on Sep. 15, 2023.

(51) Int. Cl.
*G06F 7/00* (2006.01)
*G06F 11/1474* (2026.01)
*G06F 16/23* (2019.01)
*G06F 17/00* (2019.01)

(52) U.S. Cl.
CPC ...... *G06F 11/1474* (2013.01); *G06F 16/2358* (2019.01); *G06F 16/2379* (2019.01); *G06F 2201/87* (2013.01)

(58) Field of Classification Search
None
See application file for complete search history.

(56) References Cited

U.S. PATENT DOCUMENTS

2015/0172390 A1* 6/2015 Colrain ................. H04L 67/148
709/203
2017/0220621 A1* 8/2017 Colrain ............... G06F 11/0745
2024/0394263 A1* 11/2024 Diaconu ........... G06F 16/24573

* cited by examiner

*Primary Examiner* — Tuan A Pham
(74) *Attorney, Agent, or Firm* — HICKMAN BECKER BINGHAM LEDESMA LLP

(57) ABSTRACT

Techniques are described for Transaction Guard to impose at-most-once execution by generating and using the database's native transaction identifier, DB XID. In an implementation, DB XID is unique within a (pluggable) database instance (with local undo) and uniquely identifies a transaction in the database. The Transaction Guard that is extended to use native transaction information determines the commit outcome using the native transaction identifier of the transaction instead of relying on the persistence of the Logical Transaction Identifier (LTXID) in a separate table. Using the native transaction identifier, the Transaction Guard significantly improves performance by eliminating the extra write(s) incurred during commit operations.

20 Claims, 5 Drawing Sheets

NATIVE TRANSACTION GUARD

BENEFIT CLAIM AND RELATED APPLICATIONS

This application claims the benefit under 35 U.S.C. § 119 (e) of provisional application 63/538,564, filed Sep. 15, 2023, the entire content of which is hereby incorporated by reference for all purposes as if fully set forth herein.

This application is related to:

U.S. Pat. No. 9,600,371, entitled "Preserving Server-Client Session Context," filed Jul. 5, 2012, U.S. Pat. No. 8,924,346, entitled "Idempotence For Database Transactions," filed Apr. 16, 2012, U.S. Pat. No. 8,984,170, entitled "Idempotence For Database Transactions," filed Apr. 16, 2012, U.S. Pat. No. 8,549,154, entitled "Recovering Stateful Read-Only Database Sessions," filed Sep. 9, 2011, U.S. Pat. No. 8,725,882, entitled "Masking Database Outages From Clients And Applications," filed Jul. 31, 2012, U.S. Pat. No. 9,124,670, entitled "Transactional And Non-Transactional Data For Maintaining Session State," filed Mar. 31, 2014, U.S. Pat. No. 9,591,103, entitled "Transactional And Non-Transactional Data For Maintaining Session State," filed Jun. 24, 2015, U.S. Pat. No. 7,502,824, entitled "Database Shutdown With Session Migration," filed May 1, 2006, U.S. Pat. No. 7,552,218, entitled "Transparent Session Migration Across Servers," filed Aug. 12, 2004, U.S. Pat. No. 8,380,665, entitled "Application Workload Capture and Replay System," filed Mar. 30, 2011, and U.S. Pat. No. 10,942,907, entitled "Safe Release of Database Sessions for Planned Maintenance Operations," filed on Nov. 3, 2017, the entire content of each of which is hereby entirely incorporated by reference as if fully set forth herein.

FIELD OF THE TECHNOLOGY

The present invention relates to the field of electronic database management, in particular to native transaction guard.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

One of the fundamental problems for recovering applications after an outage is that a commit response message that is sent back to the client is not durable (not guaranteed to be received by the client system). If there is a break in communication between the client system and the database management system (DBMS), the client system receives only an error message indicating that the communication has failed. Such an error message fails to inform the client application whether the requested operations in the previous request have been successfully executed. Most importantly, the client application receives no information about whether any commit operations or procedural calls have failed or have run to completion, successfully committing all expected transactions and session state changes. The problem is further exacerbated because the DBMS may still be running while being disconnected from the client system and committing some or all of the transactions requested by the client application.

Determining the outcome of a commit operation in a guaranteed and scalable manner following a communication failure with a DBMS is a complicated problem. If a client application needs to know whether the submission to the database was committed, the application needs to add a custom exception code to query the outcome for every possible commit point in the application. Given that a system can fail anywhere, this is impractical because the verification result query must be specific to each submission. Once a client application is developed and deployed, this is completely impractical. Moreover, a verification query cannot give an accurate answer because the transaction could commit immediately after the query for the results of the commit is executed.

Indeed, following a communication failure, the DBMS may still be running the submission, not yet aware that the client system has been disconnected. For a PL/SQL or Java® operation calls to the DBMS, there is no record for a procedural submission as to whether the submission ran to completion or was aborted part way through. While the operation may have been committed, the subsequent work may not have been done for that procedure.

Failing to recognize that the last submission has committed or shall commit sometime soon or has not run to completion may lead to duplicate transaction submissions and other forms of "logical corruption" as users and software might try to re-issue the already persisted changes.

One approach to prevent logical corruption is to use Transaction Guard, a logic within a DBMS that uses a Logical Transaction Identifier (LTXID) to track transaction committal, as described further in detail in the later sections. LTXID, among other features, a) uniquely identifies a transaction submitted by the client application, b) is persisted in a (system) table (transaction history table, LTXID_TRANS) at commit time, c) may be used to reliably obtain the transaction's outcome (e.g., using a procedure known as GET_LTXID_OUTCOME), including commit and completion status, d) preserves the outcome returned, even if the outcome is requested multiple times, e) retains a history of commits, and/or f) prevents out of order transaction execution for the same logical session using a monotonically increasing commit number.

Persisting the LTXID in the transaction history table as part of the commit of each database transaction introduces an overhead for transaction operations. This overhead in terms of performance and redo generation is a visible consumption of computing resources, especially in the case of small but frequent transactions (high-intensity online transaction processing (OLTP)).

BRIEF DESCRIPTION OF THE DRAWINGS

In the drawings of certain embodiments in which like reference numerals refer to corresponding parts throughout the figures.

DETAILED DESCRIPTION

Figure 1:
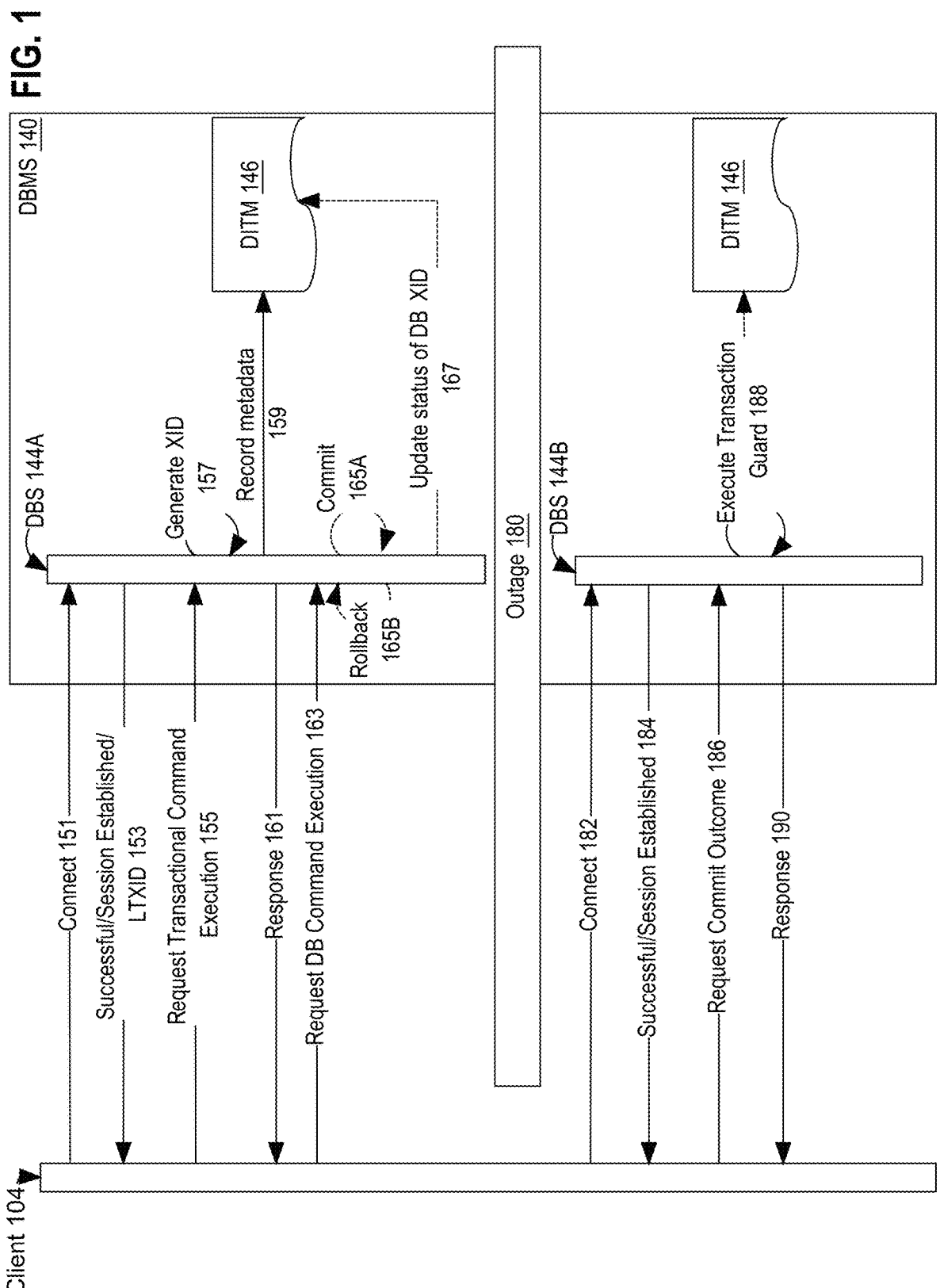
FIG. 1 is a sequence diagram that depicts an execution of a transaction, in one or more implementations.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe extending Transaction Guard to use a natively maintained transaction identifier (DB XID) in a DBMS. A client system may ascertain the status of the transaction on a database even after an outage using DB XID, without the additional cost of recording the transaction in the logical transaction history table. In particular, the techniques leverage that the DBMS already generates, stores, and expires a native transaction identifier at various points in the lifecycle of the transaction, and therefore, no additional operations may be needed to maintain the idempotency of the transaction.

In an implementation, the native transaction identifier is embedded in a logical transaction identifier (LTXID), which is used to retrieve transaction information in the logical transaction history table. Unlike the lifecycle of the logical transaction identifier, the native transaction identifier may expire after the corresponding transaction is committed. Thus, when the native transaction identifier has been generated and is returned to the client system, the client application may ascertain that the transaction has been initiated but not yet committed. When the transaction is committed or rolled back, the database's own internal transaction metadata storing data structure (DITM) is updated accordingly for the native transaction identifier. When the client application identifies the native transaction identifier in the response, the client application may ascertain whether the transaction has been committed/rolled back/active even after an outage.

Accordingly, the database's own transaction identifier (also referred to as "native transaction identifier") may deterministically provide the status for certain types of transactions for which the client receives the database's native transaction identifier. The transactions by a client application, in which the request to commit a transaction is sent to the DBMS, separately from the operations to be committed within the transaction, are referred herein to as "top-level" transactions. With such a transaction, the database server has an opportunity to use the database's own transaction identifier (DB XID) when a separate request to start a transaction is received. More importantly, the database server may return to the client application the generated native transaction identifier when the transaction has started and before the COMMIT request for the transaction is issued. Accordingly, for a top-level transaction, the client application has already received the database's transaction identifier before any commit request is sent to the server. Accordingly, the client application may use the received native transaction identifier to guarantee idempotence with the unambiguous determination of the status of the transaction, e.g., whether the transaction has been committed or not. Accordingly, the techniques are applicable to the transaction types that are not committed in the same round trip as they are started, and those transaction types that are not embedded within database procedural code (e.g., procedural extension for SQL (PLSQL) and database embedded java virtual machine (OJVM)).

Using techniques described herein, the database server determines that the received transaction request is a top-level transaction and, therefore, avoids updating the logical transaction history table for the transaction and, rather, relies on the native transaction identifier storage to determine the commit outcome if an outage occurs. The determination regarding whether the transaction is a top-level transaction commit is less compute resource-intensive than maintaining the transaction history in the logical transaction history table. When the DB XID is used for the top-level transaction commit outcome determination, the heavy-weight operations of inserting/updating the logical transaction history table may be completely avoided.

In an implementation, after an outage occurs, at reconnection, the extended Transaction Guard uses the native transaction identifier to determine the status of the top-level transaction commit. The database server continues to maintain the transaction history for other types of transactions in the logical transaction history table, and the commit outcome of such transactions may be determined by the Transaction Guard using the logical transaction history table after the outage.

Introduction to Transactions, Transaction Guard and Logical Transaction Identifier (LTXID)

A transaction is a set of operations that change data. In database systems, the operations are specified by one or more database commands. Committing a transaction refers to making the changes for a transaction permanent in the database. To preserve data integrity, changes by a transaction are made atomically, in an all-or-nothing manner, when the transaction is committed. Either all of the changes are committed, or the transaction is rolled back. When a transaction is made permanent, the logical transaction identifier is recorded as a part of that transaction at commit.

In various examples provided herein, a database system provides transaction idempotence from the perspective of the database transactional layer and extends access to this information to clients using "logical transaction IDs", LTXID.

The logical transaction ID is a globally unique identifier that uniquely defines a database transaction from the application perspective. The LTXID may be stored in a session handle and/or in a connection object of the client-driver. LTXID is the foundation of idempotence semantics.

In an implementation, a DBMS (as part of the Transaction Guard) maintains a logical transaction table in every (pluggable) database, such as the primary database, the standby database and the logical standby database. An application connects with the corresponding driver to the primary database. When the driver connects to the primary database, it starts a new database session. As part of the session creation, it also creates a new LTXID. The LTXID is only created and stored in the user session structure in memory and is then returned to the client driver. The LTXID may not yet be stored in the transaction history table. The new LTXID is returned to the driver, and the user may use the session handle to obtain transaction COMMIT outcome using LTXID.

In one implementation, the LTXID includes:

Version

Database identifier

Includes Pluggable database identifier for consolidated databases

Database instance identifier

Username

Logical Transaction GUID (GUID)

Commit number (also referred to as "Commit counter") and/or

Service identifier

In various implementations, the LTXID may be used to support at-most-once execution semantics for:

Local transactions,

Autonomous transactions,

Commit on Success (auto-commit),

Read-only transactions,

Recursive transactions,

Distributed and Remote transactions,

Parallel DML,

Job Scheduler transactions and/or

XA transactions.

The logical transaction identifier (LTXID) is automatically assigned at session establishment. In one implementation, the LTXID is an opaque structure that cannot be read by an application. In one implementation, the LTXID is unique for the life of the session.

In one implementation, for scalability, the running commit number is increased when a database transaction is committed. In one example, the LTXID starts at commit number zero. The LTXID might change only when changes are committed to the database. If only reading, the LTXID does not change.

In one implementation, a database server in the database system keeps track of transactions that were committed by the database server, recording the logical transaction IDs, and the database server prevents transactions from being completed more than once by blocking those that did not commit, also using the LTXID because such transaction may be attempted on the failover session.

After committing, the next LTXID to use is returned to the client. In one implementation, a running commit number that is part of the LTXID is incremented and returned to the client as part of the LTXID after each commit completes or after each set of commands that includes at least one commit completes.

In one implementation, Transaction Guard, a logic within the DBMS, uses LTXID to eliminate the possibility of duplicate transactions. The LTXID is persisted on commit and is reused following a rollback. During normal runtime, an LTXID is automatically held in the session at both the client and database server for each database transaction. At commit, the LTXID is persisted as part of committing the transaction.

The Transaction Guard ensures that if a database session fails over to a standby database while handling a transaction, then the transaction may be completed on a new failed over database session without the risk of having the transaction also completed on the original database session. Transaction Guard accomplishes this by enforcing the uncommitted state by blocking, on the new session, the transaction(s) identified by that LTXID from committing in the original session, in an implementation. The database server may provide transaction idempotence transparently to the client and in a manner that scales for multiple clients in multiple sessions with multiple database servers, even when multiple transactions are being executed in a session.

In one implementation, the database server uses the idempotence to replay the transaction in another session, and perhaps in another instance of the database, even if the original transaction was not completed during the first attempt. Each replay attempt has its own LTXID. The database server updates the commit number for committed transactions against the database. No parts of the LTXID are recorded after the first committed transaction on the session. Transaction types may include, for example, transactions executed using Commit-on Success (auto-commit), from inside PL/SQL, from inside server-side Java, from remote transactions, from parallel transactions, from distributed transactions, and from callouts that cannot otherwise be identified using generic means. The server uses the LTXID to support at-most-once execution semantics such that database transactions protected by LTXIDs cannot be duplicated regardless of whether there are multiple copies of the transaction in flight. In other words, the client may submit several requests to complete the same transaction, and the database server may prevent the transaction from being completed more than once.

In one implementation, the database server blocks committing in-flight work to ensure that, regardless of the failover, another submission of the same transaction, for example, by a browser or mid-tier client, cannot commit. The database server may identify repeated attempts to complete the same transaction by keeping track of the state of the transaction as affected by the various attempts to complete the transaction using an LTXID for each attempt to resubmit that transaction. For example, the database server may enforce the uncommitted state by updating the logical transaction ID that represents a transactional set of commands to a blocked state when the database server attempts to resolve the set of commands in case the set of commands had already been submitted for execution.

In one implementation, the database server keeps track of work that is committed for a set of commands associated with an LTXID. The database server may identify whether work was committed as part of a top-level call (client to the database server) or was embedded in a procedure such as a PL/SQL or Java procedure at the database server, or as part of a commit operation that involved returning other information such as out binds or returned messages. The database server may store an indication that the set of commands has an embedded commit state when the transaction commits. The embedded commit state indicates that, while a commit is completed, the entire procedure in which the commit has been executed has not yet run to completion. Any work beyond the commit cannot be guaranteed to have been completed until the parent procedure returns to the database server and all results are received by the client.

In an example method, the primary database server receives a set of commands for execution in a session. The primary server session already holds the LTXID that was passed to the client at the authentication or that the client has obtained at checkout. The set of one or more commands, if completed in the session, would cause the execution of a first server operation that starts a transaction and a second server operation that commits the transaction. In this example, the server determines whether the set of commands includes at least one command that, if executed, would start at least one transaction. In response to determining that the set of commands includes at least one command that, if executed, would start at least one transaction, the server updates stored information for the LTXID as part of the commit operation. In one example, the database server performs a server operation that includes both committing changes and inserting or updating stored information to the transaction history table to indicate that at least one transaction in the set of commands has been committed using that LTXID. After committing, a new LTXID is generated and returned to the client on the return trip for the commit message.

In one implementation, the primary database server stores a transaction history table that includes an entry for each transactional set of commands of the multiple transactional sets of commands that were received in the session. The database server may update the stored information to indicate that a transaction has started in a set of commands by adding an entry to the transaction history table for the set of commands.

In one implementation, a mapping of LTXIDs to database transactions is persisted in a transaction history table. For a given session, a database server may insert if the first time for an LTXID or update a current LTXID when the database server executes a COMMIT on the next transactions in that same session. The insert or update is stored in the transaction history table, which is available to other sessions and database servers in case of a failover.

In one implementation, the database server registers a callback to insert or update an LTXID entry in a transaction history table when a transaction is committed. The callback executes at COMMIT to create or update an LTXID at commit. As a part of making the redo for the transaction durable, the database server may increment the commit number in the LTXID by one or indicate the commit in some other predictable or deterministic manner. After COMMIT is executed, the database server may return the incremented commit number to the client which would be ready for use in the next transaction.

Extra Processing Work to Maintain Logical Transaction History Table

Any update to the logical transaction history table may be an expensive operation even when using optimized techniques. The logical transaction history table is a logical table in a DBMS, in an implementation. As such, any update to the logical transaction history table also includes another write to record the redo record for this update. If implemented using high level SQL, another write is performed for the undo record of the update for performing a possible rollback of the update. The undo record may include its own corresponding redo record, and thus, another write may be performed to generate the redo record for the undo record. When an implementation uses SQL to write the LTXID, the single write into a logical transaction history table to record the transaction history would cause another three writes to undo and redo data blocks of the DBMS, making it four writes in total for the logical transaction history table update.

When using optimized write techniques, the logical transaction history table is maintained and updated using a direct write technique, in addition to only incrementing the commit number. The direct write technique circumvents all but the first redo write, and all undo writes, and directly updates the logical transaction history. A small redo record is generated for the change to the COMMIT number. Yet even with the direct write technique, extra processing work is required to maintain logical transaction identifiers for Transaction Guard.

Native Transaction Identifier

Techniques described herein eliminate the above-described extra write(s) required for maintaining transaction information in the logical transaction history table for certain types of transactions. The techniques leverage the Database's Internal Transaction Metadata (DITM) in the DBMS, which is a stored native data structure maintained for every transaction. To execute any transaction, the DBMS maintains metadata about the transaction in the DITM. Using these metadata in the DITM (e.g., undo records), the DBMS may ensure the idempotency of certain types of transactions using the techniques described herein.

The transaction metadata for each transaction is identified by the database's own transaction identifier (DB XID) of a transaction to which the transaction metadata is related. To provide the DB XID to the client, the LTXID is extended to include the DB XID for the transaction and sent as part of the LTXID to the client that initiated the transaction.

The client systems may use the DB XID to determine the commit outcome status of the corresponding transaction for a transaction without the DBMS storing the transaction information in the logical transaction history table. Since the LTXID structure is opaque to the application/client system layers and is only interpreted by the DBMS, this change does not affect client-side APIs and thus, the existing client applications using the client-side APIs.

FIG. 1 is a sequence diagram that depicts an execution of a transaction, in one or more implementations. At step 151, Client 104 requests to connect with Database Server (DBS) 144A of DBMS 140. In response to the successful authentication of Client 104, DBS 144A establishes a database session with Client 104 at step 153.

At step 155, DBS 144A of DBMS 140 receives a request to execute database commands. If the commands include a request to modify or initiate modification of data in DBMS 140 (e.g., a DML statement), DBMS 140 initiates (explicitly requested or implicit) transactions for the execution of such requests. Accordingly, a DB XID is generated for the transaction at step 157.

At step 159, DBS 144A records the metadata for the transaction in DITM 146. The generated DB XID and the status of the corresponding transaction may be maintained persistently in DITM 146. In one implementation, DITM 146 is stored in an undo tablespace accessible by API calls. The status of the DB XID is updated synchronously in DITM 146 to indicate that the transaction is active (e.g., at step 159) or has been committed (e.g., at step 165A) or rolled back (e.g., at step 165B). DB XIDs are assigned in a scalable manner across sessions and across database instances by creating multiple DITMs, such as DITM 146, that may be maintained separately by each database instance.

In an implementation, a database instance may itself store multiple DITMs available to use at a time, and a transaction may select any of them for recording its DB XID statuses when the transaction starts. Regardless of the number of transactions, each transaction is represented by a unique DB XID, and the DBMS provides a deterministic way to retrieve transaction information using the DB XID.

Continuing with FIG. 1, after step 165A or 165B, once a transaction ends (due to a commit or a rollback, respectively), the DB XID may be deactivated or overwritten at step 167 in DITM 146. For example, the corresponding entries of the transaction may be overwritten in DITM 146 by a different transaction. In such scenarios, the transaction layer applies undo to DITM 146 that may reveal older DB XIDs. However, if the corresponding undo has already been reclaimed, it is not possible to find the state of the transaction with the DB XID, and an error may be raised as a response to the request for the DB XID, in an implementation. Other techniques, such as deleting the entry or marking the entry inactive, may be used to indicate the expiration of the DB XID at step 167.

An example difference between the LTXID and the DB XID is that while the LTXID is always known to Client 104 before submitting a request to DBMS 140 (as a new LTXID is returned to Client 104 each time), the DB XID is only known to Client 104 after the database server has started a transaction on return from the user call that starts the transaction. To resolve this, a callback is registered by the Transaction Guard extended with the techniques described herein and with the response to the client from the first round trip in the transaction, the LTXID with the XID is received at the client. In such an implementation, the redo change at COMMIT of the original Transaction Guard (that relies on the logical transaction history table) is replaced with an extra network piggyback to the client at the registration of a transaction.

For example, in FIG. 1, if the command execution at step 155 contains a commit request (or rollback), then Client 104 at step 155 has no knowledge of the DB XID for the transaction. By the time Client 104 receives the response by DBS 144A at step 161, Client 104 already has the knowledge about the success of the transaction, and any DB XID returned at step 161 is not useful for Client 104 to ascertain the commit outcome.

On the other hand, if the transaction is not yet committed, DBS 144A returns the DB XID generated at step 157 and recorded in DITM 146 at step 159 in the response at step 161. In this scenario, Client 104 may use the DB XID to ascertain the success or failure of steps 165A/B of Rollback and Commit, in response to Client 104's request to commit the transaction at step 163.

For example, when Outage 180 occurs, and Client 104 loses its connection to DBMS 140, Client 104 may reconnect at steps 182 and 184 (albeit even with a different server of DBMS 140, DBS 144B). Upon establishing a new session with DBMS 140, Client 104 may use the received DB XID at step 161 to request a commit outcome at step 186. Using techniques described herein, at step 188, Transaction Guard is executed to retrieve the outcome using information about the transaction in DITM 146, and the resulting commit outcome is returned to Client 104 at step 190.

In an implementation, the states of DB XIDs relevant for Transaction Guard are ACTIVE/INACTIVE, and these states can be mapped to COMMITTED/NOT_COMMITTED outcomes as discussed herein.

Transaction Guard Usage of Native Transaction Identifier

In an implementation, Transaction Guard is extended to leverage DB XID in addition to LTXID for a top-level transaction, for which client applications receive DB XID before the transaction is requested to be committed. When DB XID is leveraged, in such cases, the transaction history table may no longer need to be updated for the transaction, and, thus, the techniques provide for a higher efficiency transaction.

For a top-level commit transaction, the DB XID generated by DBMS 140 ensures the idempotent execution of the transaction. Such a transaction was started in a previous request to DBMS 140. Accordingly, the previous request has to have successfully delivered a response to Client 104, and Client 104, therefore, has maintained the LTXID and the (valid) DB XID for the transaction initiated in the previous request.

For other commits such as PL/SQL calls to DBMS 140, DDLs, XA transactions and COMMIT_ON_SUCCESS (aka Embedded commits), the process fallbacks to the original Transaction Guard logic that uses the logical transaction history (LTXID_TRANS) table for ensuring at-most-once-execution.

Figure 2:
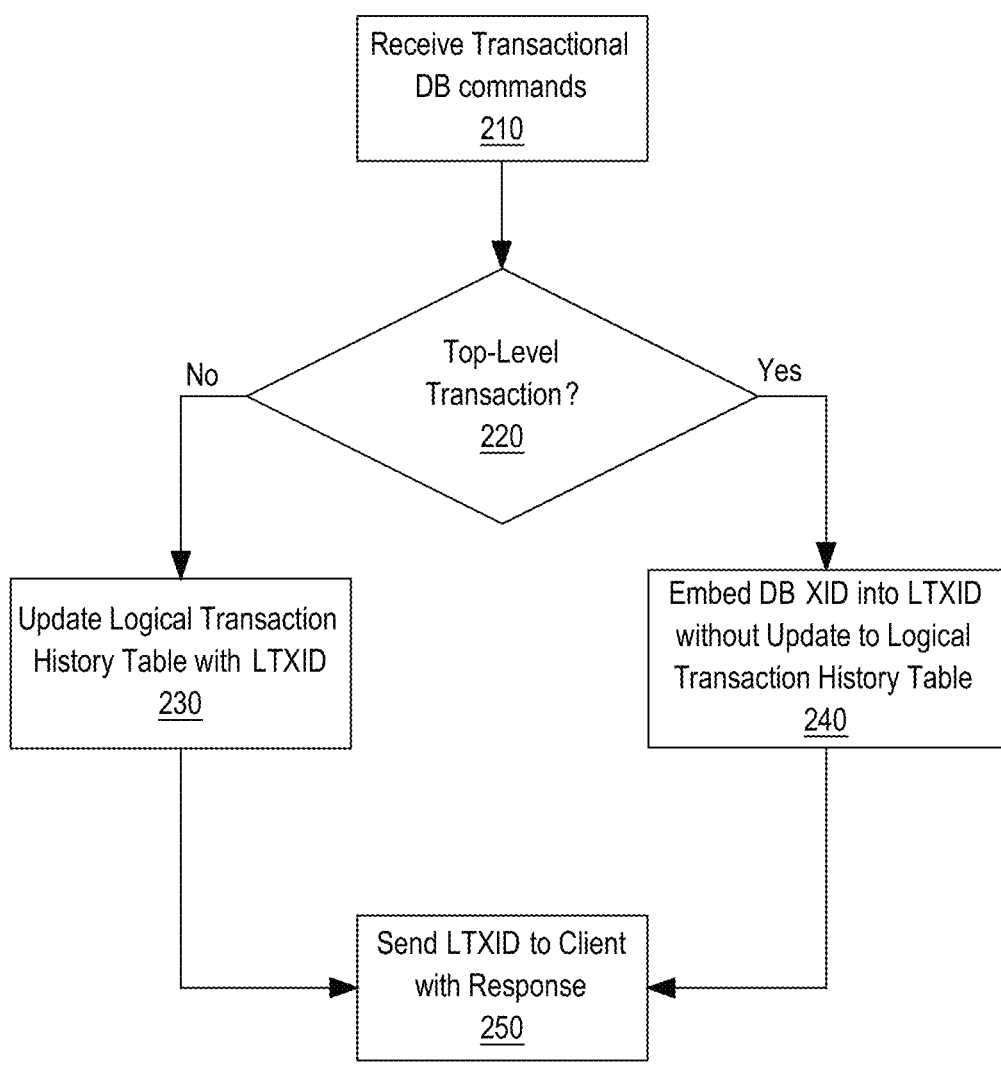
FIG. 2 is a block diagram that depicts a process for extending Transaction Guard for top-level transactions to use a native transaction identifier (DB XID), in an implementation.

FIG. 2 is a block diagram that depicts a process for extending Transaction Guard for top-level transactions to use a native transaction identifier (DB XID), in an implementation. At step 210, DBMS 140 receives a set of transactional commands from Client 104 (e.g., step 155 in FIG. 1). For example, before the receipt of the transaction commands when Client 104 establishes a session with DBMS 140, at the initiation of the session, the LTXID and the DBXID are initialized. LTXID is initialized to commit number 0, and DB XID is INVALID at the session logon, as an example. When the DML operation(s) are received at step 210, the Transaction Guard generates the first redo for a transaction and registers pre-commit and post-commit callbacks.

At step 220, DBMS 140 determines whether the transaction is a top-level transaction or a non-top-level transaction. In one implementation, DBMS 140 may determine that the commands contain command(s) for transaction commit operation(s) and, therefore, are non-top-level transaction operations. Alternatively, DBMS 140 may determine that the command(s) are to be auto-committed. Conversely, DBMS 140 may determine that the commands fail to contain a commit operation and/or only contain an open transaction operation and, therefore, are part of a top-level transaction.

The process proceeds to step 240 if the process determines that the transaction is a top-level transaction. Continuing with the above example, if the DML operation(s) are determined to be part of a top-level transaction, Transaction Guard continues to use the pre-commit callbacks but may not directly write to the logical transaction history table (LTXID_TRANS) table. Instead, the process at step 240 embeds the DB XID generated for the top-level transaction into the LTXID at step 240.

Otherwise, if the transaction is a non-top-level transaction, the process proceeds to step 230. At step 230, the logical transaction history table is updated with the transaction information when committed. For example, if the DML operation(s) are for a non-top-level transaction (e.g., embedded transaction commits and commits within PL/SQL block transactions), Transaction Guard falls back to the LTXID-based determination. Hence, the pre-commit callback may directly or otherwise update the LTXID_TRANS table with an updated commit number when the transaction commits (commit counter) in the session-level LTXID.

At step 250, the LTXID, which, depending on the transaction type, may include the native transaction identifier, is sent to Client 104 with the response to the received transactional commands at step 210 when the transaction is registered. This is an extra network piggyback that replaces the direct write to the logical transaction history table at COMMIT, improving the performance of the Transaction Guard in terms of redo generation. If an outage occurs, and whenever such an outage occurs in the lifecycle of the transaction, Client 104 may determine the outcome of the transaction using the received LTXID at step 250.

Determining Commit Outcome after Outage

As described above, for top-level transactions, the commit status may be interrogated using the DB XID presence in Client 104 token (e.g., LTXID). Hence, the pre-commit and post-commit callbacks generated by the DML avoid the insertion into the LTXID_TRANS table and the subsequent increment of the commit number in the LTXID. Regardless of the LTXID's actual content, the client continues the process of the marshaling/unmarshaling of the token being sent and received without any change to the processing logic.

Figure 3:
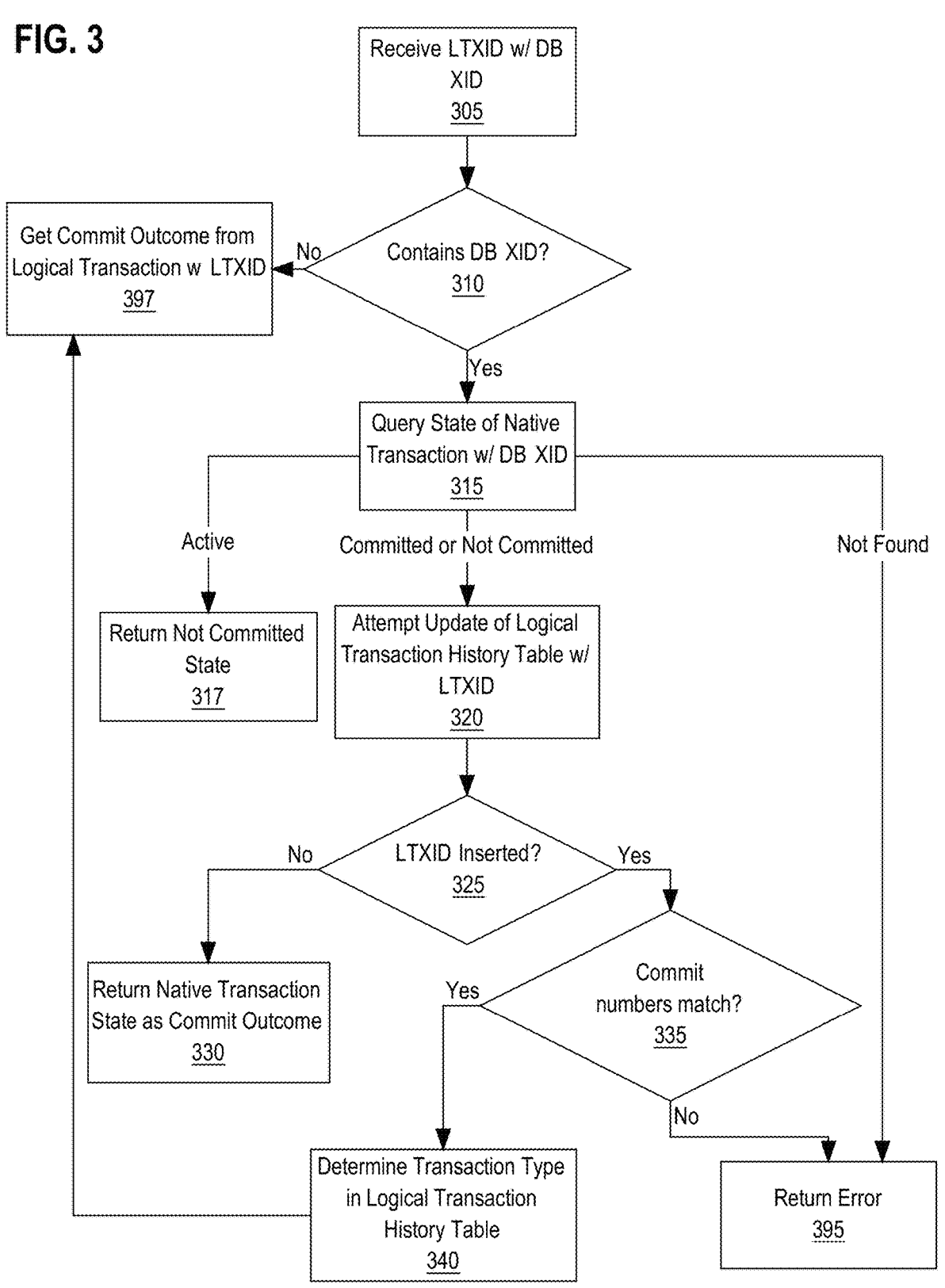
FIG. 3 is a block diagram that depicts the process of determining the commit outcome of a transaction after an outage, in an embodiment.

FIG. 3 is a block diagram that depicts the process of determining the commit outcome of a transaction after an outage, in an embodiment. When a transactional command request to DBMS 140 fails due to communication/network/server outages, Client 104 (e.g., client driver) maintains the LTXID that is received in a previous response from DBMS 140 to Client 104. The LTXID may include DB XID depending on the transaction type of the transactional commands sent in the previous request. However, this information is opaque to Client 104. Without any knowledge of the content of the LTXID, Client 104 requests commit outcome from DBMS 140 by providing LTXID.

At step 305, DBMS 140 receives the request from Client 104 that contains the LTXID. This step corresponds to step 186 of FIG. 1, in which, after Outage 180, Client 104 requests a commit outcome with the LTXID. Client 104 may use the LTXID to inquire about the transaction (e.g., using the Transaction Guard techniques). For example, Transaction Guard techniques on Client 104 (e.g., the client driver-side) may invoke GET_LTXID_OUTCOME (or when using Application Continuity, PREPARE_REPLAY (internal GET_LTXID_OUTCOME), using the LTXID and that may contain the DB XID returned in the previous request (note that the contents of the LTXID or the token thereof are opaque to the client, the client passes down the LTXID as received). In response, DBS 144B of DBMS 140 executes the Transaction Guard at step 188, which may include one or more steps of FIG. 3 described below.

Continuing with FIG. 3, at step 310, DBMS 140 determines whether the received LTXID contains a DB XID identifier. DB XID returned to DBMS 140 in the token either indicates the transaction as committed or rolled back in DITM 146. For Client 104 to rely on the result returned, the Transaction Guard has to guarantee the COMMIT outcome even when using DB XID. DBMS 140 does not force the COMMIT outcome for the DB XID. Instead, if the incarnation of the database cluster of DBMS 140 is the same as previously known and if the original database instance is alive, DBMS 140 searches for and kills the original session so that the further execution of commands in the session may not further change the transaction.

After the original session is no longer valid (e.g., no longer alive), DBMS 140 may use the DB XID to quickly and resource-efficiently ascertain from DITM 146 whether the transaction has been committed or not (ACTIVE/INACTIVE, respectively) by searching through DITMs of the original database instance.

If, at step 310, DBMS 140 determines that the LTXID fails to contain any DB XID, then the previous transaction command(s) were part of a non-top-level transaction. Such types of transactions may include embedded transactions, which are committed by an internally issued commit command (e.g., OCI_COMMIT_ON_SUCCESS, XA distributed commits and single or multiple commits within a PL/SQL call). Accordingly, the process proceeds to step 397. At step 397, DBMS 140 invokes Transaction Guard with LTXID to FORCE the commit outcome using the logical transaction history table.

Continuing with FIG. 3, if at step 310, it is determined that the received LTXID by DBMS 140 contains DB XID, then the process transitions to step 315. At step 315, DBMS 140 queries DITM 146 belonging to the original database instance with the DB XID to determine the state of the transaction. If the DB XID is still active, at step 317, DBMS 140 may kill the session to abort the transaction. Hence, DBMS 140 may return to Client 104 that the transaction has NOT_COMMITTED.

If the DB XID is not found at step 315, the process transitions to step 395, and DBMS 140 returns to Client 104 that an error has occurred because the corresponding undo was overwritten (inconclusive outcome). Transaction information, including its state and other metadata in DITM 146, may be overwritten for memory management purposes. For example, once a transaction has been committed or rolled back, after a particular time duration (e.g., 15 minutes), the memory slot storing the transaction may be reused by the next transaction. Accordingly, the process may no longer be able to accurately provide the commit outcome for the transaction and respond with an error at step 395.

If, at step 315, the transaction in DITM 146 is identified as either committed or not committed, the process transitions to step 325 to determine if the transaction was indeed a top-level transaction type. If it is determined to be so in steps 325 to 395, then the state queried from DITM 146 at step 315 may be solely relied on for the commit outcome response to Client 104.

When determining the COMMIT outcome, DBMS 140 attempts to block the logical transaction history table with the LTXID received at step 305. The process may use the force outcome function interface to ascertain the status of the transaction (if any) in the logical transaction history table. If, at step 325, it is determined that the attempt to update/insert the LTXID into the logical transaction history table fails, then the transaction type is a top-level commit transaction. The process proceeds to step 330, and DBMS 140 returns the state of the transaction as queried from DITM 146.

Otherwise, if, at step 325, the LTXID is inserted/updated successfully in the logical transaction history table, then at step 335, the numbers of commits (commit counters) are compared. If the commit counter in the LTXID does not match the commit number in the logical transaction history table at step 335, then the commit outcome is unknown, and an error is returned to Client 104 at step 395. Otherwise, if the number of commits matches at step 335, then the logical transaction history has successfully tracked the transaction. The process proceeds to step 340 for determining the type of transaction based on other metadata of the function call, in an implementation. Using the information from the logical transaction history table, the process may proceed to request the commit outcome for the transaction from the logical transaction history table using the LTXID at step 397 and return the status to Client 104.

Functional Overview Examples

In Tables 1, 2 and 3, examples 1, 2 and 3 are respectively described. The "Client Request" column describes Client 104 interaction with DBMS 140. "Input Token" describes DBMS 140-generated token (e.g., LTXID) that is received by Client 104 due to the interaction described in the "Client Request" column. The "Output Token" column describes DBMS 140-generated token (e.g., LTXID) that resulted from the action by DBMS 140 in the "DBMS Action" column. DBMS 140 action in the "DBMS Action" column is caused by the interaction of Client 104 in the "Client Request" column. For example, the "Input Token" column describes the token values of GUID, Commit Number, and DB XID (in the same order) before DBMS 140 action in the "DBMS Action", and the "Output Token" describes the token values of GUID, Commit Number, DB XID (in the same order) after DBMS 140 action in the "DBMS Action" column.

In Tables 1, 2 and 3, initially, at session logon, only GUID is generated by DBMS 140 and returned to Client 104. As described in Table 1, when a DML statement is received by DBMS 140, DBMS 140 starts executing the operations in the transaction and thus generates DB XID1 for the transaction, which is returned to Client 104. Since DB XID1 is received by Client 104, Client 104 may now deterministically inquire about the commit outcome from DBMS 140 without receiving the acknowledgment for the top-level commit request, OCITransCommit (next row in Table 1), from DBMS 140. Accordingly, the Transaction Guard avoids incrementing the commit number or updating the transaction history table with a new LTXID, as shown in the "Output Token" column of Table 1. Instead, DBMS 140 zero-es out/expires DB XID1, and Client 104's unsuccessful (because of the expiration) query for DB XID1 after an outage would indicate that the previous client request for commit was successfully executed by DBMS 140, and no replay is necessary. DBMS 140 saves considerable computing resources and lag time in general operations as well as recovery from the outage by avoiding updating the transaction history table with incremental commit number.

Similarly, for another top-level transaction, as described in the last two rows of Table 1, DB XID2 is generated and received by Client 104. When a rollback request is received by DBMS 140 from Client 104 (last row of Table 1), DBMS 140 performs the rollback and zero-es out (expires) DB XID2. Similarly, even if the output token fails to reach Client 104 due to an outage, Client 104 may query DBMS 140 for DB XID2, and if unsuccessful (because of the expiration), then the previous rollback request by Client 104 was successfully executed by DBMS 140.

TABLE 1

| | Example 1 - DML in Top-Level Transaction | | |
| --- | --- | --- | --- |
| Client Request | Input Token | DBMS Action | Output Token |
| Session logon | — | | (GUID, 0, 0) |
| Simple DML | (GUID, 0, 0) | No commit yet DB XID1 is active | (GUID, 0, DB XID1) |
| OCITransCommit | (GUID, 0, DB XID1) | Top-level commit, No update to LTXID_TRANS table, No increment in commit_number | (GUID, 0, 0) |
| Simple DML | (GUID, 0, 0) | DB XID2 is active | (GUID, 0, DB XID2) |
| Rollback | (GUID, 0, DB XID2) | Rollback, no update to LTXID_TRANS table, No increment in commit_number | (GUID, 0, 0) |

Unlike example 1 of Table 1, in the PL/SQL examples 2 and 3, as described in Tables 2 and 3 below, the client token at the time of issuing the PL/SQL block contains an INVALID DB XID. Particularly, in example 3, Table 3, unlike example 2, Table 2, the DB XID is not even expired; the DB XID has the value of DB XID4 even after the PL/SQL request. Thus, when an outage occurs after Table 3's PL/SQL request, which contains an embedded commit, without receiving the output token for the operation, Client 104 maintains a token with DB XID4. When DB XID4 is presented to DBMS 140, DBMS 140 has to do additional processing using Transaction Guard logic (such as steps 325 to 397 of FIG. 3) to determine the commit outcome of PL/SQL block. In such a scenario, DBMS 140 has to use the LTXID, and the transaction history table update to determine the commit outcome of the DML request and/or the PL/SQL's DML request.

TABLE 2

| | Example 2 - DML in Top-level Transaction in PL/SQL Block | | |
| --- | --- | --- | --- |
| Client Request | Input Token | DBMS Action | Output Token |
| Session logon | — | | (GUID, 0, 0) |
| Simple DML | (GUID, 0, 0) | No commit yet DB XID3 is active | (GUID, 0, DB XID3) |
| OCITransCommit | (GUID, 0, DB XID3) | Top-level commit, No update to LTXID_TRANS table, No increment in commit_number | (GUID, 0, 0) |

TABLE 2-continued

| Example 2 - DML in Top-level Transaction in PL/SQL Block | | | |
|---|---|---|---|
| Client Request | Input Token | DBMS Action | Output Token |
| PL/SQL block<br>{<br>  DML<br>  commit<br>} | (GUID, 0, 0) | Embedded commit,<br>update LTXID_TRANS<br>table, increment<br>commit_number | (GUID, 1, 0) |

TABLE 3

| Example 3 - DML within PL/SQL block | | | |
|---|---|---|---|
| Client Request | Input Token | DBMS Action | Output Token |
| Session logon | — | | (GUID, 0, 0) |
| Simple DML | (GUID, 0, 0) | No commit yet,<br>DB XID is active | (GUID, 0, DB XID4) |
| PL/SQL block<br>{<br>  commit<br>  DML<br>  commit<br>} | (GUID, 0, DB XID4) | Embedded commits,<br>fall back to updating<br>LTXID_TRANS table<br>and incrementing<br>commit_number by 1 | (GUID, 1, 0) |

As an example of commit determination, the COMMIT_OUTCOME function is called to find the outcome of the previous transaction submitted to DBMS 140. COMMIT_OUTCOME provides the LTXID augmented with DB XID (which could be valid or invalid/expired as described above) and expects DBMS 140 to return either COMMITTED/NOT_COMMITTED and a status (COMPLETE/NOT_COMPLETE) for Client 104 request.

Benchmark Results

The techniques described herein eliminate the LTXID_TRANS table DMLs that maintain the commit outcome. Hence, it eliminates the REDO, UNDO, REDO for UNDO and maintenance overhead that would have otherwise been incurred. The following benchmark results show the performance benefits.

SPECj workload

DB CPU: +1.2% DB CPU compared to no Transaction Guard 2-3% lower database CPU compared to the Transaction Guard without DB XID check.

Redo: +0% compared to no Transaction Guard, 100% lower compared to the Transaction Guard without DB XID check (which itself is +6% compared to no Transaction Guard)

Database Management System Over View

A database management system (DBMS) manages a database. A DBMS may comprise one or more database servers. A database comprises database data and a database dictionary that are stored on a persistent memory mechanism, such as a set of hard disks. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In embodiments, the databases may be structured as key-value stores (e.g., NoSQL or JSON) where different database objects may represent different data structures. Key-values and associated objects can be referenced, for example, by utilizing look-up tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL; some versions are standard and some proprietary, and there are a variety of extensions. Data definition language ("DDL") commands are issued to a database server to create or configure database schema, including database containers, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to run that service. One or more computing nodes hosting the database server are referred to as running or hosting the service. A service is assigned, at runtime, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor; the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 4:
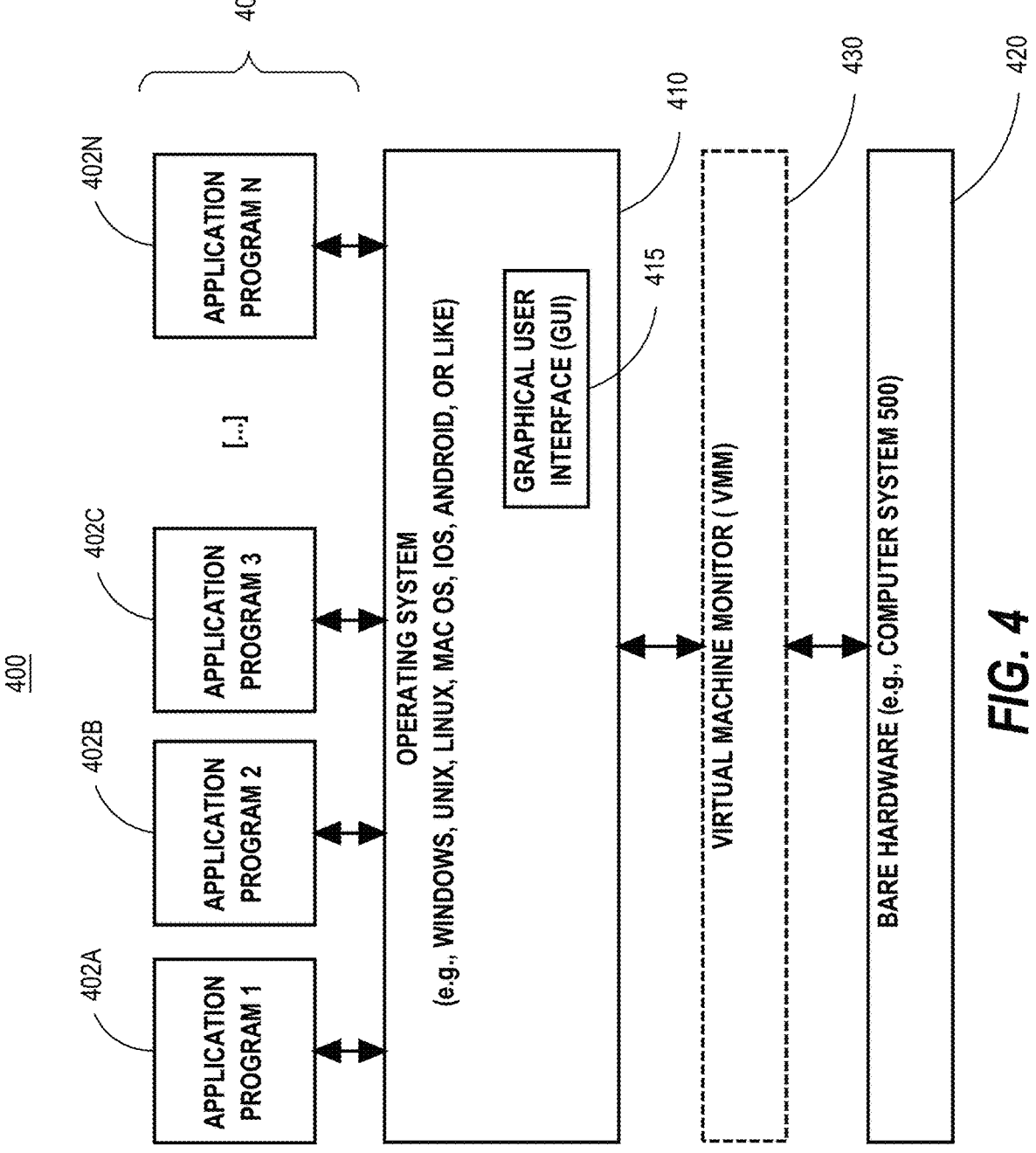
FIG. 4 is a block diagram of a basic software system, in one or more embodiments.
Figure 5:
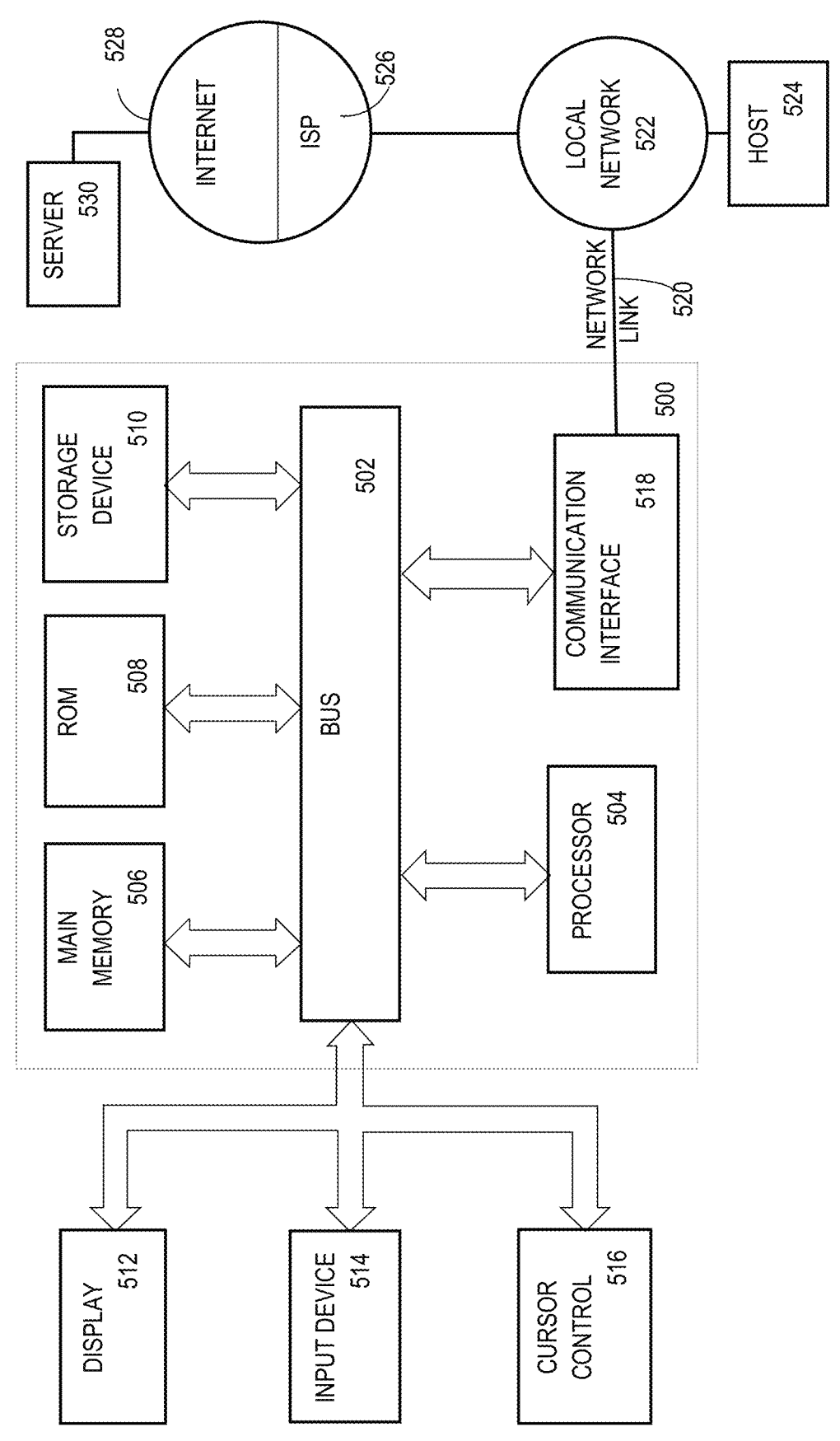
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or another online service).

Software system 400 includes a graphical user interface (GUI) 415, for receiving user commands and data in a graphical (e.g., "point-and-click" or "touch gesture") fashion. These inputs, in turn, may be acted upon by system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Over View

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or another dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal, and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526, in turn, provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510 or other non-volatile storage for later execution.
Computing Nodes and Clusters A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system.

A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

receiving, by a database management system (DBMS), a first set of commands of a first transaction for execution in a first session of the DBMS with a first client and a second set of commands of a second transaction for execution in a second session of the DBMS with a second client;

wherein the execution in the first session of the first set of commands causes the DBMS to generate a first transaction identifier that uniquely identifies the first transaction in the DBMS and is valid during a lifecycle of the first transaction;

determining that the first transaction is a top-level transaction type, wherein a request to commit the first transaction is sent to the DBMS, separately from the first set of commands to be committed within the first transaction;

wherein the execution in the second session of the second set of commands causes the DBMS to generate a second identifier that uniquely identifies the second transaction in the DBMS and is valid during a lifecycle of the second transaction;

determining that the second transaction is a non-top-level transaction type;

based, at least in part, on a) the determining that the first transaction is a top-level transaction type, and b) the determining that the second transaction is a non-toplevel transaction type, modifying a logical transaction history table of the DBMS with a commit outcome of the second transaction without modifying the logical transaction history table of the DBMS with transaction information of the first transaction;

in response to receiving the first transaction identifier from the first client, determining a commit outcome of the first transaction.

2. The method of claim 1, further comprising:

in response to receiving the first set of commands, sending to the first client the first transaction identifier in a first token;

wherein the first token is generated for querying the logical transaction history table.

3. The method of claim 1, further comprising:

prior to receiving the second set of commands of the second transaction, sending to the second client, a second token;

wherein the second token corresponds to information about the commit outcome of the second transaction stored in the logical transaction history table.

4. The method of claim 1, further comprising:

receiving a first commit outcome request in a third session with the first client different from the first session, wherein the first commit outcome request includes a particular token;

determining whether the particular token contains a native transaction identifier;

without querying the logical transaction history table, determining that the native transaction identifier is the first transaction identifier;

based at least in part on the first transaction identifier, determining the commit outcome of the first transaction.

5. The method of claim 1, further comprising:

receiving a first commit outcome request in a third session with the first client different from the first session, wherein the first commit outcome request includes a particular token;

determining that the particular token contains a native transaction identifier;

without querying the logical transaction history table, determining that the native transaction identifier is invalid;

based, at least in part, on the determining that the native transaction identifier is invalid and, in response to the first commit outcome request, determining that the first commit outcome request is not ascertainable.

6. The method of claim 1, further comprising:

receiving a first commit outcome request in a third session with the first client different from the first session, wherein the first commit outcome request includes a particular token;

determining that the particular token contains a native transaction identifier;

determining that the particular native transaction identifier is the first transaction identifier;

based, at least in part, on a) the determining that the particular token contains the native transaction identifier, and b) determining that the native transaction identifier is the first transaction identifier, identifying a commit outcome associated with the first transaction identifier as the commit outcome of the first transaction.

7. The method of claim 1, further comprising:

receiving a first commit outcome request in a third session with the first client different from the first session, wherein the first commit outcome request includes a particular token;

determining that the particular token contains a native transaction identifier;

based, at least in part, on determining that the particular token contains the native transaction identifier, determining that the particular token is recorded in the logical transaction history table;

based at least in part on the particular token and the logical transaction history table, determining the commit outcome for the first transaction.

8. The method of claim 1, further comprising:

receiving a first commit outcome request in a third session with the first client different from the first session, wherein the first commit outcome request includes a particular token;

determining that the particular token contains a native transaction identifier;

based, at least in part, on determining that the particular token contains the native transaction identifier, determining that the particular token is recorded in the logical transaction history table;

based, at least in part, on determining that the particular token is recorded in the logical transaction history table, retrieving a commit counter from the logical transaction history table that corresponds to the particular token;

based, at least in part, on comparing the commit counter from the logical transaction history table with a commit counter of the particular token, determining whether the commit outcome for the first transaction is ascertainable.

9. The method of claim 1, further comprising:

receiving a first commit outcome request in a third session with the first client different from the first session, wherein the first commit outcome request includes a particular token;

determining whether the particular token contains a native transaction identifier;

based, at least in part, on determining that the particular token contains the native transaction identifier, determining that the particular token is recorded in the logical transaction history table;

based, at least in part, on determining that the particular token is recorded in the logical transaction history table, retrieving a commit counter from the logical transaction history table that corresponds to the particular token;

based, at least in part, on determining that the commit counter from the logical transaction history table matches a commit counter of the particular token, determining the commit outcome for the first transaction using information in the logical transaction history table associated with the particular token.

10. The method of claim 1, further comprising:

receiving a second commit outcome request in a fourth session with the second client different from the second session, wherein the second commit outcome request includes a particular token;

determining that the particular token fails to contain a native transaction identifier;

based, at least in part, on determining that the particular token fails to contain the native transaction identifier, determining the commit outcome of the second transaction at least by querying the logical transaction history table with the particular token.

11. One or more non-transitory computer-readable media storing a set of instructions, wherein the set of instructions includes instructions, which when executed by one or more hardware processors, cause:

receiving, by a database management system (DBMS), a first set of commands of a first transaction for execution in a first session of the DBMS with a first client and a second set of commands of a second transaction for execution in a second session of the DBMS with a second client;

wherein the execution in the first session of the first set of commands causes the DBMS to generate a first transaction identifier that uniquely identifies the first transaction in the DBMS and is valid during a lifecycle of the first transaction;

determining that the first transaction is a top-level transaction type, wherein a request to commit the first transaction is sent to the DBMS, separately from the first set of commands to be committed within the first transaction;

wherein the execution in the second session of the second set of commands causes the DBMS to generate a second identifier that uniquely identifies the second transaction in the DBMS and is valid during a lifecycle of the second transaction;

determining that the second transaction is a non-top-level transaction type;

based, at least in part, on a) the determining that the first transaction is a top-level transaction type, and b) the determining that the second transaction is a non-toplevel transaction type, modifying a logical transaction history table of the DBMS with a commit outcome of the second transaction without modifying the logical transaction history table of the DBMS with transaction information of the first transaction;

in response to receiving the first transaction identifier from the first client, determining a commit outcome of the first transaction.

12. The one or more non-transitory computer-readable media of claim 11, wherein the set of instructions further includes instructions, which when executed by said one or more hardware processors, cause:

in response to receiving the first set of commands, sending to the first client the first transaction identifier in a first token;

wherein the first token is generated for querying the logical transaction history table.

13. The one or more non-transitory computer-readable media of claim 11, wherein the set of instructions further includes instructions, which when executed by said one or more hardware processors, cause:

prior to receiving the second set of commands of the second transaction, sending to the second client, a second token;

wherein the second token corresponds to information about the commit outcome of the second transaction stored in the logical transaction history table.

14. The one or more non-transitory computer-readable media of claim 11, wherein the set of instructions further includes instructions, which when executed by said one or more hardware processors, cause:

receiving a first commit outcome request in a third session with the first client different from the first session, wherein the first commit outcome request includes a particular token;

determining whether the particular token contains a native transaction identifier;

without querying the logical transaction history table, determining that the native transaction identifier is the first transaction identifier;

based at least in part on the first transaction identifier, determining the commit outcome of the first transaction.

15. The one or more non-transitory computer-readable media of claim 11, wherein the set of instructions further includes instructions, which when executed by said one or more hardware processors, cause:

receiving a first commit outcome request in a third session with the first client different from the first session, wherein the first commit outcome request includes a particular token;

determining that the particular token contains a native transaction identifier;

without querying the logical transaction history table, determining that the native transaction identifier is invalid;

based, at least in part, on the determining that the native transaction identifier is invalid and, in response to the first commit outcome request, determining that the first commit outcome request is not ascertainable.

16. The one or more non-transitory computer-readable media of claim 11, wherein the set of instructions further includes instructions, which when executed by said one or more hardware processors, cause:

receiving a first commit outcome request in a third session with the first client different from the first session, wherein the first commit outcome request includes a particular token;

determining that the particular token contains a native transaction identifier;

determining that the native transaction identifier is the first transaction identifier;

based, at least in part, on a) the determining that the particular token contains the native transaction identifier, and b) determining that the native transaction identifier is the first transaction identifier, identifying a commit outcome associated with the first transaction identifier as the commit outcome of the first transaction.

17. The one or more non-transitory computer-readable media of claim 11, wherein the set of instructions further includes instructions, which when executed by said one or more hardware processors, cause:

receiving a first commit outcome request in a third session with the first client different from the first session, wherein the first commit outcome request includes a particular token;

determining that the particular token contains a native transaction identifier;

based, at least in part, on determining that the particular token contains the native transaction identifier, determining that the particular token is recorded in the logical transaction history table;

based at least in part on the particular token and the logical transaction history table, determining the commit outcome for the first transaction.

18. The one or more non-transitory computer-readable media of claim 11, wherein the set of instructions further includes instructions, which when executed by said one or more hardware processors, cause:

receiving a first commit outcome request in a third session with the first client different from the first session, wherein the first commit outcome request includes a particular token;

determining that the particular token contains a native transaction identifier;

based, at least in part, on determining that the particular token contains the native transaction identifier, determining that the particular token is recorded in the logical transaction history table;

based, at least in part, on determining that the particular token is recorded in the logical transaction history table, retrieving a commit counter from the logical transaction history table that corresponds to the particular token;

based, at least in part, on comparing the commit counter from the logical transaction history table with a commit counter of the particular token, determining whether the commit outcome for the first transaction is ascertainable.

19. The one or more non-transitory computer-readable media of claim 11, wherein the set of instructions further includes instructions, which when executed by said one or more hardware processors, cause:

receiving a first commit outcome request in a third session with the first client different from the first session, wherein the first commit outcome request includes a particular token;

determining whether the particular token contains a native transaction identifier;

based, at least in part, on determining that the particular token contains the native transaction identifier, determining that the particular token is recorded in the logical transaction history table;

based, at least in part, on determining that the particular token is recorded in the logical transaction history table, retrieving a commit counter from the logical transaction history table that corresponds to the particular token;

based, at least in part, on determining that the commit counter from the logical transaction history table matches a commit counter of the particular token, determining the commit outcome for the first transaction using information in the logical transaction history table associated with the particular token.

20. The one or more non-transitory computer-readable media of claim 11, wherein the set of instructions further includes instructions, which when executed by said one or more hardware processors, cause:

receiving a second commit outcome request in a fourth session with the second client different from the second session, wherein the second commit outcome request includes a particular token;

determining that the particular token fails to contain a native transaction identifier;

based, at least in part, on determining that the particular token fails to contain the native transaction identifier, determining the commit outcome of the second transaction at least by querying the logical transaction history table with the particular token.

\* \* \* \* \*